May 9, 1967 W. A. BAUER 3,318,337
REINFORCED FLEXIBLE CORRUGATED METAL HOSE ASSEMBLY
Filed July 17, 1964
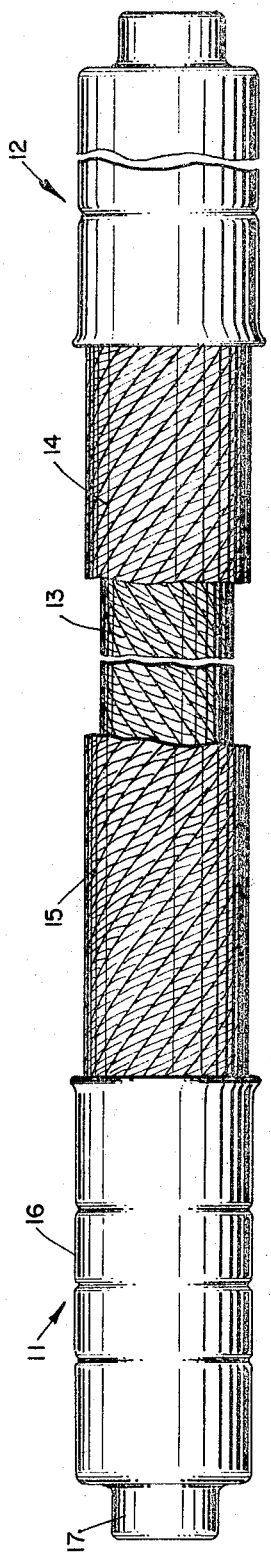
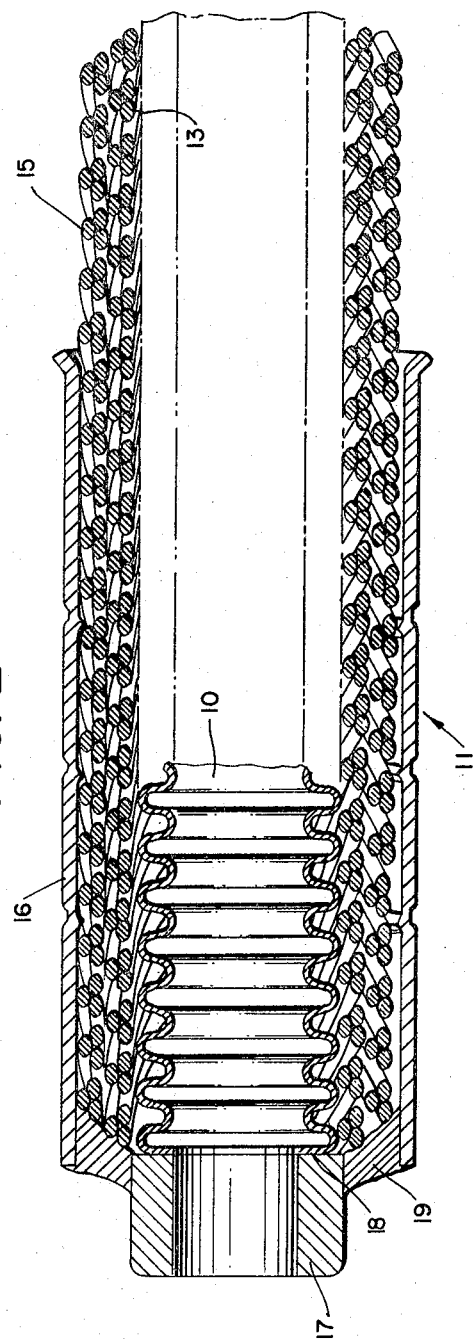
INVENTOR.
WILLIAM A. BAUER
BY Pennie, Edmonds, Morton, Taylor and Adams
ATTORNEYS United States Patent Office 3,318,337
Patented May 9, 1967

3,318,337
REINFORCED FLEXIBLE CORRUGATED METAL
HOSE ASSEMBLY
William A. Bauer, Oxford, Conn., assignor to Anaconda
American Brass Company, a corporation of Connecticut
Filed July 17, 1964, Ser. No. 383,354
4 Claims. (Cl. 138—130)

This invention relates to a reinforced flexible corrugated metal hose assembly and more particularly it relates to such a hose assembly in which the reinforcement is provided by at least two layers of stranded cable wound about the corrugated hose in opposite helical directions.

Flexible hose assemblies which are to be used under conditions in which they will be subjected to very high internal pressures are generally constructed of a length of corrugated metal hose defining the core of the assembly and have an outer reinforcement about the core which is attached to end fittings on the respective ends of the core. A reinforcement is required because a length of corrugated hose has higher inherent hoop strength than it has tensile strength and an unrestrained length will tend to increase in length when internal pressure is applied. A length of corrugated metal hose which is restrained only at its ends will resist longitudinal growth until pressure induced forces tending to cause longitudinal extension of the length of hose exceed the column strength of the hose, at which point buckling or squirming of the hose will result. For this reason when a hose assembly is being constructed to provide a flexible assembly which is capable of withstanding high internal pressures it has been the practice to provide a braided wire reinforcement sheath which surrounds the length of corrugated hose and is attached to the respective end fittings of the assembly.

This braided wire reinforcement provided two reinforcing functions. First it restrained the corrugated hose against elongation but permitted a degree of flexility so that bending of the length of corrugated hose was permitted. Second it provided a reinforcing sheath about the length of metal hose which reinforced the hose against buckling due to the internal pressures. Although these braided reinforcing sheaths are widely used, they are also generally recognized as being somewhat unsatisfactory in that they lack the desired tensile resistance and impose restrictive limitations on the flexibility of the assembly. To improve tensile resistance of these braided reinforcements it has been the practice to incorporate several layers of braided sheaths in the construction of the assembly. Even these multiple sheaths have been unsatisfactory because of the practical difficulty of getting braided sheaths possessing the same tightness. The difference in tightness of the sheaths resulted in differences in tensile resistance between layers and the assembly was not greatly improved by the additional layers of sheath.

It has also been proposed to use layers of helically wound wires as the reinforcement in hose assemblies of this type, but it was found that the wires were difficult to wind into an assembly having a closed reinforcing layer because of the number of wires required, and more importantly it was found that because the individual strands of wire were not longitudinally elastic, the amount of flexibility imparted to the assembly was limited by the angular orientation of the wires relative to the core and the required flexibility was never realized.

Thus, the main problem is to provide a reinforcement on hose assemblies of this type which are capable of coping with the massive restraint required for the thrust force of pressures within the hose and still preserve the inherent flexibility of the corrugated metal hose. I have found that these requirements can be met in this type of metal hose assembly by using at least two layers of stranded cables which are helically wound side-by-side, with the helical orientation of the stranded cables in the first layer extending in a direction opposite to the stranded cables in the second layer.

Broadly stated, the invention consists of reinforcement means for use in a flexible metal hose assembly having a corrugated metal hose core and end fitting assemblies attached to the respective ends of the core. The reinforcement means is comprised of a first layer of a plurality of stranded cables helically wound side-by-side about the corrugated metal hose core and attached within the respective end assemblies. A second layer of a plurality of stranded cables is helically wound side-by-side about the first layer with a helical extension opposite to the helical extension of the first layer. The helical orientation of the strands is such as to impart a balance of tensile and hoop reinforcing strength to the core.

It has particularly been found that the helical orientation of the stranded cable should be at an angle of 30 to 50° relative to the core in order to provide the proper resistance to squirm and resistance to elongation of a given length of corrugated metal hose which will give the maximum in burst pressure to the hose assembly. It is to be noted that by using stranded cable in the formation of the reinforced hose assembly, which cable is formed by twisting several wires together, a minimum number of reinforcing elements are required to be wound around the core. Another important feature in the use of stranded cables which contributes to the excellent reinforcing characteristics is the property inherent in stranded cables of longitudinal elasticity. It can be appreciated that owing to the nature of the reinforcing layers in the new hose assembly it has greater flexibility than reinforcing layers heretofore used because each of the stranded cable elements itself permits some longitudinal elongation and is not dependent entirely upon the helical orientation of the reinforcing elements.

A preferred embodiment of the invention is described hereinbelow with reference to the drawing wherein:

FIG. 1 is a longitudinal side elevation, partly broken away, of the hose assembly of the invention; and FIG. 2 is an enlarged section of the hose assembly of FIG. 1 taken along one end fitting.

As shown in the figures the hose assembly consists of a length of corrugated metal hose 10 which has end fitting assemblies 11 and 12 attached to the respective ends thereof. The corrugated metal hose 10 is surrounded by a first layer 13 of helically wound stranded cables and a second layer 14 of stranded cables which are helically wound about the first layer 13 in an opposite helical direction. The respective end portions of the stranded cables in the first and second layers 13 and 14 are held within the end fittings 11 and 12.

Each of the stranded cables 15 shown is comprised of three wires which are twisted together to form the stranded cable structure. An example of the type cable which can be used is stranded aircraft cable. The stranded cable elements in each layer are helically wound so that they are packed side-by-side in close parallel abutting relationship to each other. The purpose of this abutting relationship is to make certain that when the hose is flexed, the stranded cable members are unable to shift and gather toward one side and thereby present an opening in the reinforcement through which the hose could be exposed and under the internal forces become damaged or possibly burst.

It is particularly to be noted that the stranded cable elements are helically wound such that the first layer 13 extends in a helical direction opposite to the helical direction of the second layer 14. It is also preferred that the angle of orientation of the stranded cable relative to the core axis be the same in both the first and the second layers. As will be seen the angle of the stranded cables determines its flexibility and its other reinforcing characteristics, and in order to insure that the layers of stranded cable function in a cooperative manner it is necessary that their reinforcing characteristics be the same.

It has been found that the angle of orientation of the stranded cable elements 15 relative to the core axis should fall within a range of 30 to 50°. It has been found that outside of this range the advantageous reinforcing characteristics of the stranded cable are substantially diminished. It is clear that if the stranded cables were laid nearly parallel to the axis of the core a substantial tensile effect would be produced which would effectively resist the tendency toward an increase in over-all length to the assembly due to pressure induced forces. Of course, very little radial strength would be imparted to the assembly and there would be a pronounced tendency for the corrugated metal hose to squirm under pressure because of this restraint and the result would be an assembly with a relatively low burst pressure. It has been found that this is the result when angles less than 30° are used.

It is equally clear that if the stranded cable elements were laid in a relatively flat angle approaching 90° to the core axis, the hose assembly would have a high degree of radial containment but the assembly would also have a pronounced tendency to elongate under pressure. This tendency to elongate under pressure is in itself undesirable but in addition there is a tendency for the convolutions to spread irregularly, and this localized spreading of the convolutions led to a loss of radial strength at that point, inversion of the convolutions due to pressure, and resulted in premature failure by bursting. It has been found that this will occur when the angle of orientation used is greater than 50°. Therefore, depending upon the particular tubular member used, the angle of the stranded cables should generally fall within the 30 to 50° range relative to the core axis.

As shown in FIG. 2, the end fitting assembly 11 is one commonly used in the art. It consists of an elongated tubular ferrule 16 which surrounds the outer and inner layers 13 and 14 of stranded cables at the marginal portion of the hose assembly and is swaged down about the second layer 14 so as tightly to grip the first and second layers of the stranded cable elements between the corrugated metal hose member 10 and the ferrule. A tubular fitting 17 abuts the endmost corrugation 18 of the metal hose and a deposit of filler metal 19 is provided between the terminal fitting 17 and the ferrule 16 to join these two elements and the layers of stranded cable together at the endmost portion of the assembly. The filler metal can be applied by a welding, brazing, or hard soldering operation.

It is finally to be noted that it has been found by testing that the metal hose assembly described gives better strength under pressure and greater flexibility than hose assemblies using the braided wire reinforcement which has been used extensively in assemblies of this type; and this new assembly is recognized as a substantial improvement in this field.

I claim:

1. In a flexible metal hose assembly having a corrugated metal hose core, and end fitting assemblies attached to the respective ends of said core, reinforcement means in combination therewith comprising a first layer of a plurality of stranded cables helically wound side-by-side about the corrugated metal hose core and attached to the respective end assemblies, and a second layer of a plurality of stranded cables helically wound side-by-side about said first layer with a helical extension opposite to the helical extension of said first layer and attached to the respective end assemblies.

2. In a flexible metal hose assembly having a corrugated metal hose cord, and end fitting assemblies attached to the respective ends of the core, reinforcement means in combination therewith comprising a first layer of a plurality of stranded cables helically wound side-by-side about the corrugated metal hose core and attached to the respective end assemblies, and a second layer of a plurality of stranded cables helically wound side-by-side about said first layer with a helical extension opposite to the helical extension of the first layer and attached to the respective end assemblies, said stranded cables in each layer being wound at an angle from about 30 to about 50° relative to the core axis.

3. In a flexible metal hose assembly having a corrugated metal hose core, and end fitting assemblies attached to the respective ends of the core, reinforcement means in combination therewith comprising a first layer of a plurality of stranded cables helically wound side-by-side about the corrugated metal hose core and attached to the respective end assemblies, and a second layer of a plurality of stranded cables helically wound side-by-side about said first layer and attached to the respective end assemblies, the second layer having a helical extension opposite to the helical extension of said first layer with the angle of orientation relative to the core axis of the stranded cables in the first layer being substantially the same as the angle of orientation of the stranded cables in the second layer.

4. In a flexible metal hose assembly having a corrugated metal hose core, and end fitting assemblies attached to the respective ends of said core, reinforcement means in combination therewith comprising a first layer of a plurality of stranded cables helically wound side-by-side in parallel abutting relationship to each other about the corrugated metal hose core and attached to the respective end assemblies, and a second layer of a plurality of stranded cables helically wound side-by-side in parallel abutting relationship to each other about said first layer and attached to the respective end assemblies, the second layer having a helical extension opposite to the helical extension of said first layer with the angle of orientation relative to the core axis of the stranded cables in the first layer being substantially the same as the angle of orientation of the stranded cables in the second layer, said stranded cables in each layer being wound at an angle from about 30 to about 50° relative to the core axis.

References Cited by the Examiner

UNITED STATES PATENTS

| | | | |
|---|---|---|---|
| 2,825,364 | 3/1958 | Cullen et al. | 138—130 X |
| 2,829,671 | 4/1958 | Ernst et al. | 138—130 X |
| 2,867,242 | 1/1959 | Harris et al. | 138—130 X |
| 3,212,528 | 10/1965 | Haas | 138—130 |

LAVERNE D. GEIGER, *Primary Examiner.*

SAMUEL ROTHBERG, *Examiner.*

T. L. MOORHEAD, *Assistant Examiner.*